United States Patent
Rams, Jr.

(10) Patent No.: US 7,378,979 B2
(45) Date of Patent: May 27, 2008

(54) CHILD OCCUPANCY DETECTION SYSTEM

(76) Inventor: Victor H. Rams, Jr., 5940 SW. 114 Ter., Pinecrest, FL (US) 33156

( * ) Notice: Subject to any disclaimer, the term of this patent is extended or adjusted under 35 U.S.C. 154(b) by 213 days.

(21) Appl. No.: 11/146,134

(22) Filed: Jun. 7, 2005

(65) Prior Publication Data

US 2006/0273917 A1 Dec. 7, 2006

(51) Int. Cl.
*G08B 21/00* (2006.01)
*B60Q 1/00* (2006.01)
*H01H 35/00* (2006.01)
*B60L 1/00* (2006.01)

(52) U.S. Cl. .......... 340/667; 340/457.1; 340/425.5; 340/309.16; 340/309.7; 180/271; 307/9.1; 307/10.1; 200/61.58 B; 200/85 A

(58) Field of Classification Search ........... 340/667
See application file for complete search history.

(56) References Cited

U.S. PATENT DOCUMENTS

| | | | |
|---|---|---|---|
| 5,260,684 | A | 11/1993 | Metzmaker |
| 5,949,340 | A | 9/1999 | Rossi |
| 5,952,927 | A | 9/1999 | Eshman et al. |
| D424,463 | S | 5/2000 | Babers, Jr. |
| D427,099 | S | 6/2000 | Hunter |
| 6,104,293 | A | 8/2000 | Rossi |
| 6,326,891 | B1 | 12/2001 | Lin |
| 6,601,332 | B1 | 8/2003 | Riebling |
| 6,819,233 | B2 | 11/2004 | Beaty |
| 6,847,302 | B2 | 1/2005 | Flanagan et al. |
| 6,922,147 | B1 * | 7/2005 | Viksnins et al. ......... 340/573.1 |
| 6,924,742 | B2 * | 8/2005 | Mesina .................... 340/573.1 |
| 6,998,988 | B1 * | 2/2006 | Kalce ...................... 340/573.1 |
| 7,123,157 | B2 * | 10/2006 | Best .......................... 340/666 |
| 2005/0057350 | A1 | 3/2005 | Younse |

OTHER PUBLICATIONS

International Search Report of PCT/US 06/21538 mailed Dec. 19, 2006.

* cited by examiner

*Primary Examiner*—Donnie L Crosland
(74) *Attorney, Agent, or Firm*—Reed Smith LLP; Stanley P. Fisher, Esq.; Juan Carlos A. Marquez, Esq.

(57) ABSTRACT

The invention is directed to a system for detecting the presence of a child in a car, when the driver exits the vehicle. A sensor is connected to the seat belt of the baby's car seat or to the rear seat belts. Once the seat belt is inserted into the belt buckle, an alarm circuit is activated. When the driver enters the vehicle and sits down, the system detects the presence of the driver and de-activates the alarm circuit. When the driver exits, the alarm circuit is then re-activated. The system includes a delay timer that gives the driver time to enter and exit the vehicle without setting off the alarm circuit. When the alarm circuit is activated, a timer for the time delay begins. At the end of the time delay (e.g., relay is transferred), if the driver has not disabled the alarm circuit by re-entering the vehicle or taking the child out of the vehicle, the alarm circuit will be set off warning signals and will remain energized until disabled.

8 Claims, 7 Drawing Sheets

CHILD OCCUPANCY DETECTION SYSTEM

BACKGROUND OF THE INVENTION

1. Field of Invention

This invention is related to the field of child safety and security systems for motor vehicles and motor homes. Children die every year when parents or other persons leave a child in a hot car. Many mistakenly leave a child in a car because their minds are on other things. Emergency workers try to save many of these children. However, in most cases the rescuers are unable to revive the child. There are many consequences to these tragic deaths. Obviously, the death alone is tragic. However, there have been many cases where the driver is criminally charged for the child's death.

2. Related Background Art

The use of child alarm/alert systems for automobiles is known in the prior art. For example, U.S. Pat. No. 5,793,291, U.S. Pat. No. 6,104,283, U.S. Pat. No. 5,966,070, U.S. Pat. No. 5,581,234, U.S. Pat. No. 6,028,509, U.S. Pat. No. 6,812,844, U.S. Pat. No. 5,949,340, U.S. Pat. No. 6,812,844, U.S. Pat. No. 6,104,293 and U.S. Pat. No. 306,099 are all generally related to child alarm/alert systems. However, these references do not address the problem of a child being left inside a vehicle, wherein a parent is given a warning or alarm that takes into consideration the length of time that a child is left in the vehicle in conjunction with the circumstances of the parent or driver leaving the vehicle. Rather, some prior art systems require that the ignition be turned off in order that the alarm system be activated. Other prior art systems require that there's motion within the vehicle in order to set off the alarm, thereby ignoring the possibility of the child being asleep and thus motionless. Therefore, such prior art teachings, though fulfilling some of the needs for child safety, have certain deficiencies. Consequently, there's a need to improve child safety seats with an alarm, in order to overcome the deficiencies noted above.

SUMMARY OF THE INVENTION

The present invention is directed to a system for detecting the presence of a child in a car, when the driver exits the vehicle. In one embodiment, the system consists of a switch that is connected to the seat belt of the baby's car seat. Once the baby's car seatbelt is inserted into the belt buckle the alarm is activated. The switch can also be installed into the seat belts of the rear seat. Once a seat belt is inserted into the latch of the rear seat, the alarm is also activated. When the driver enters the vehicle, and sits down to drive, the system detects the presence of the driver and de-activates the alarm. When the driver exits the car, the alarm is then re-activated.

In a further embodiment, the system includes a delay timer that gives the driver time to enter and exit the vehicle without setting off the alarm. Once the alarm is activated, a timer for the time delay begins. The alarm's output is delayed (de-energized) before and during the time delay. At the end of the time delay (e.g., relay is transferred), the alarm's output is energized and will begin to blare and remains energized until power is removed. For example, the alarm will be deactivated when the baby's car seat belt or when all the rear seat belts are removed. The timer can be regulated from 1 second to 1 hour before the alarm goes off. The time delay is crucial in that it allows the driver to get out for a predetermined set of time before the alarm sounds off.

Additionally, the prior art does not have any way for accounting for when a driver gets out of the vehicle to either refuel or access the vehicle trunk. The new and improved system of the present invention allows the driver to get out of the vehicle and pump gas without setting off the alarm. This new and improved system also allows the driver to exit the vehicle and go to the trunk and either put or take something out of the truck without setting off the alarm.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

Figure 1:
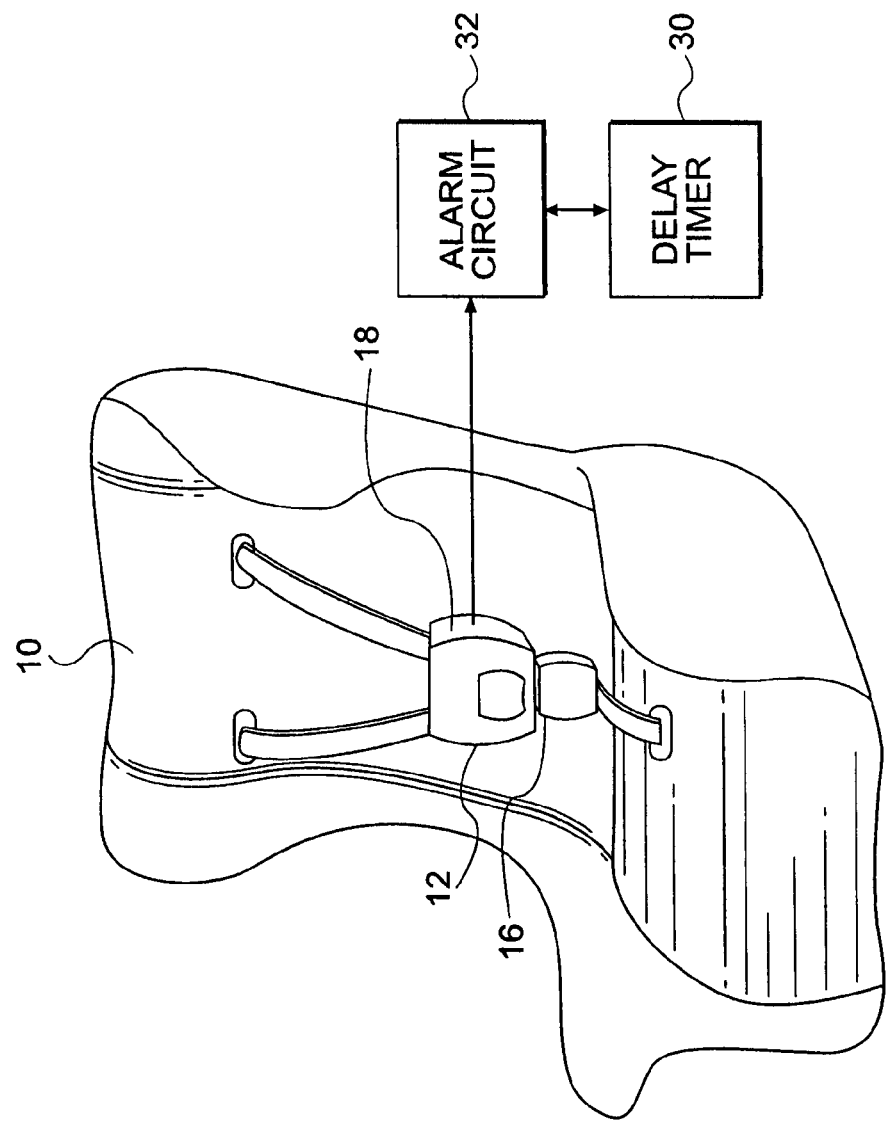
FIG. 1 shows a baby's car seat activator according to one embodiment of the present invention.

With reference to the figures, like reference characters will be used to indicate like elements throughout the several embodiments and views thereof. In particular, with reference to the figures, the present invention is directed to a system for notifying a driver that he or she left a child in the car that is relatively simple to activate and de-activate.

Figure 2:
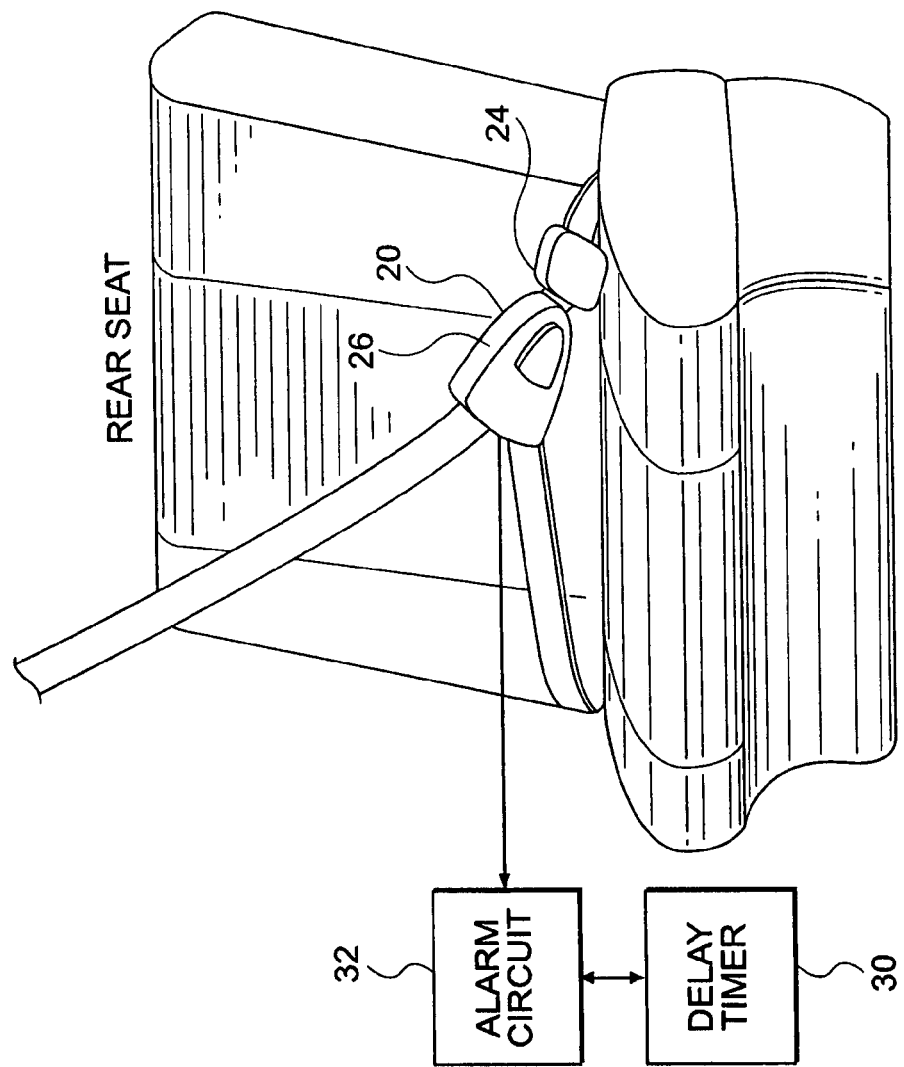
FIG. 2 shows a rear seat belt activator according to one embodiment of the present invention.

Referring to FIG. 1, when the child is belted into the car seat 10 the system and in particular the alarm circuit 32 is activated or set so as to warn of the presence of the child under predetermined conditions. The alarm circuit 32 can be activated in either the seat belt device 12 of the child car seat 10 or the rear passenger seatbelt device 20 (FIG. 2). A delay timer 30 either by itself or in conjunction with the alarm circuit 32 monitors the status of the driver being out of the vehicle giving the driver enough time to either re-enter the vehicle, conduct small activities around the vehicle, or get the child out of the car seat 10 before the alarm circuit 32 goes off. The alarm circuit 32 is automatically deactivated once the child is removed from the car seat.

Figure 7:
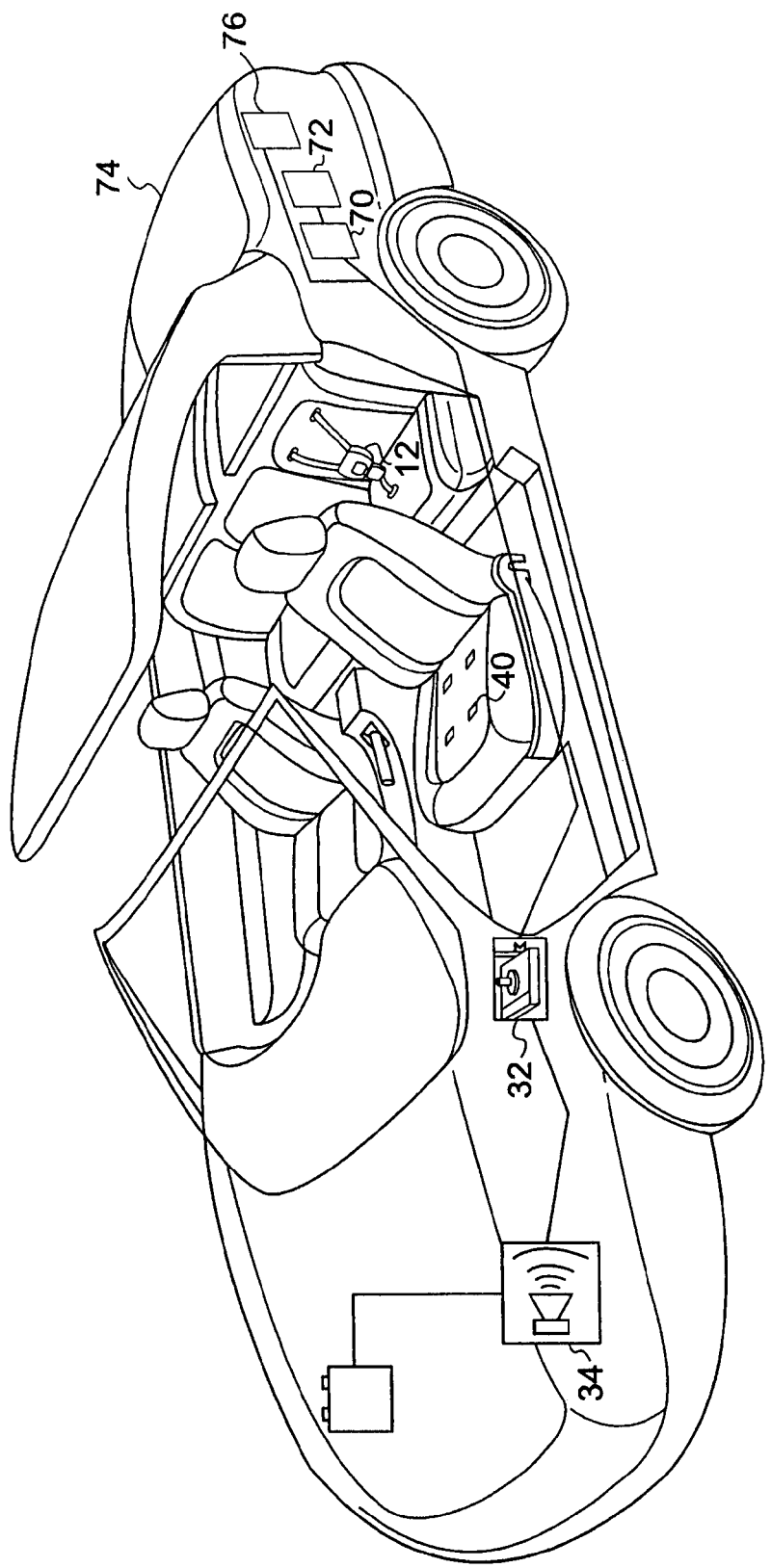
FIG. 7 shows a general wiring diagram for the driver's seat sensor system that is applicable to both the driver's seat and the portable seat cushion with a child car seat of the present invention.

Referring to FIGS. 1 and 7, the child car seat belt device 12, in one embodiment, uses a normally open (N/O) switch or sensor. This switch/sensor is located inside or attached to the baby's car seatbelt buckle 18. When the plate 16 of the child car seat belt device 12 is inserted into the belt buckle or latch 18, the plate 16 of the belt activates the switch/sensor. When the switch/sensor detects the insertion of the plate 16, the alarm circuit 32 is activated either by a simple electrical connection or by the device 12 signaling the alarm circuit 32 to activate.

Figure 8:
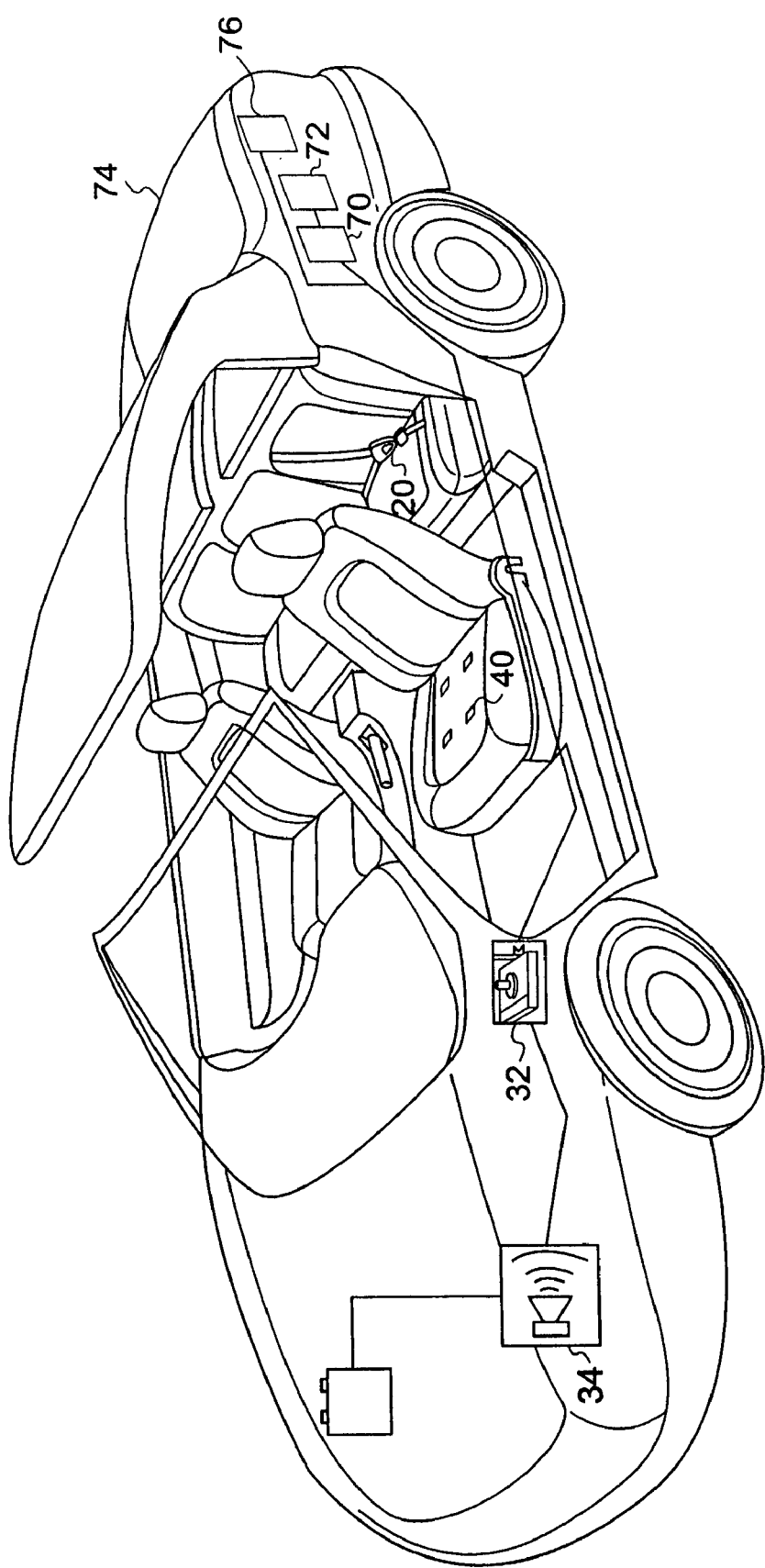
FIG. 8 shows a general wiring diagram for the driver's seat sensor system that is applicable to both the driver's seat and the portable seat cushion with rear seat belt of the present invention.

According to FIGS. 2 and 8, with a rear seat belt configuration, a normally open (N/O) switch or sensor is installed in or attached to the rear seat belt device 20 located in the rear passenger seat area. Once the plate 24 of the seat belt device 20 is inserted into the belt buckle or latch 26, the alarm circuit 32 is activated again either by a simple electrical connection or by the device 20 signaling the alarm circuit 32 to activate.

Figure 3:
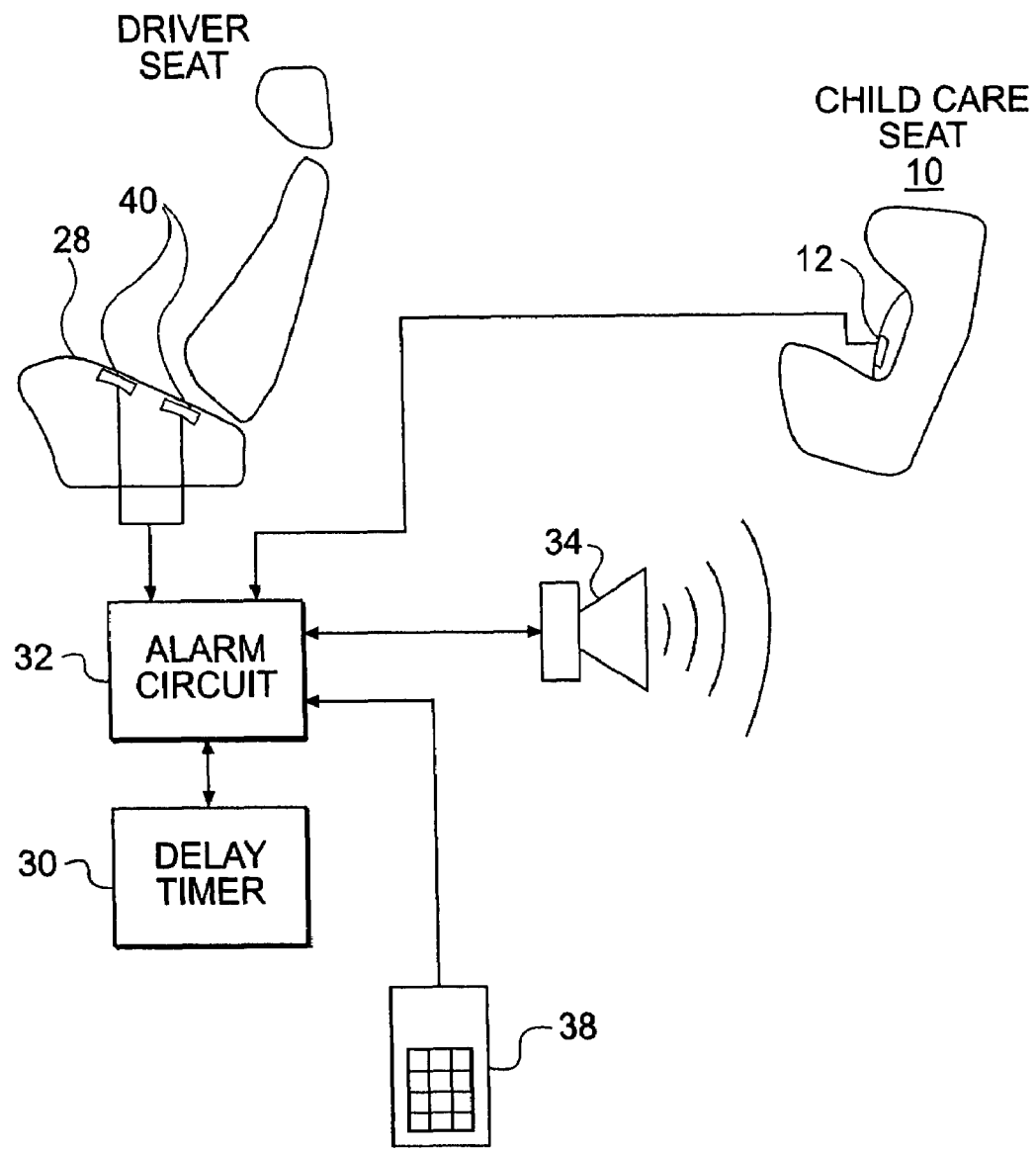
FIG. 3 shows a diagram for the wiring for the alarm according to one embodiment of the present invention.

According to FIG. 3, the system may include a delay timer 30 as part of the alarm circuit 32 connected to the driver's seat or portable seat cushion 28. Once the alarm circuit 32 is activated, the delay timer 30 begins to run according to a predetermined time period programmed into it. When the delay timer 30 finishes clocking its predetermined time period, the alarm circuit 32 will activate a warning device 34, such as the car horn, to sound out indicating that the driver is not present in the car, and thus the child is alone in the car. The timer 30 may be set to give the driver enough time to exit the vehicle, perform a relatively short task (i.e., put fuel in the vehicle at a service station, access the vehicle trunk) and re-enter the vehicle without setting off the alarm circuit 32. The driver can regulate the timer 30 using a control element in the alarm circuit 32. One example of a control element would be an alphanumeric keypad or a thumbwheel adjustment 38 connected to the timer 30 via the alarm circuit 32, which would allow the adjustment of a delay time from 1 second to one minute to fifteen minutes or longer. The timer 30 may be built with a preset upper limit (i.e., no more than 15 minutes) to preclude any attempt to bypass the safety purpose of the invention, namely to prevent a child from being left in a vehicle alone for too long a time.

In one specific implementation, the delay timer 30 uses an ELK-960 delay timer device made by ELK Products, Inc. The trigger polarity switch must be set at positive (+). The JP1 switch can be set for either seconds or minutes. The JP2 switch must be set at "repeat". The JP3 switch must be set at "begin". The JP4 switch must be set at "B". The time setting ranges from 1-60 seconds or 1 to 60 minutes. However, in order to conform to the safety purposes noted above, the device may be modified to prevent a time setting that exceeds a preset safety limit. Otherwise, any similar timer device or controller circuit or portable processor device may be substituted to implement the alarm circuit 32 and the timer 30.

Driver's Seat or Portable Cushion

Figure 4:
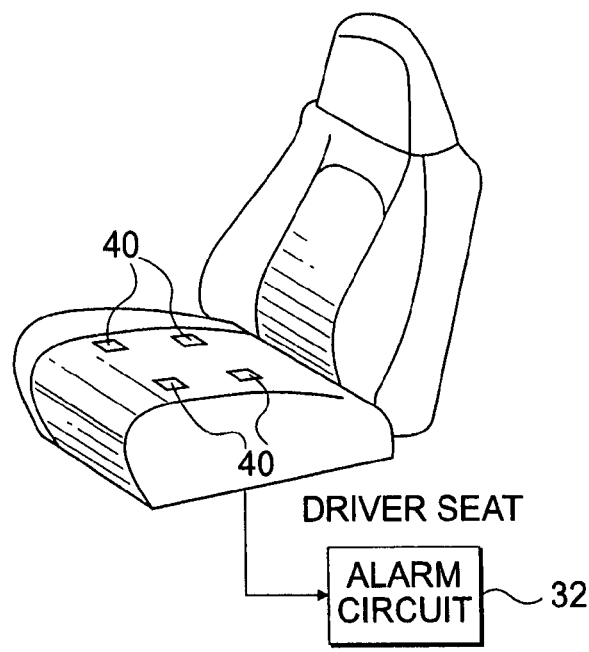
FIG. 4 shows a driver's seat sensor system according to one embodiment of the present invention.

The driver's seat is used to activate/deactivate the alarm circuit 32 or to send a signal to the alarm circuit 32 to enable/disable the timer 30. In one embodiment, there are sensors 40 located underneath the covering of the driver's seat, as shown in FIG. 4. When the driver sits down, the weight of the driver presses on the sensors 40, indicating to the alarm circuit 32 that the driver is present, and thus alarm circuit 32 should be deactivated and/or the timer 30 should be disabled. When the driver exits the vehicle, the alarm circuit 32 is again activated and/or the timer 30 begins its counting.

In one embodiment of the driver seat sensors 40, contact switches are positioned at several locations throughout the seat. There are two ways that these switches can be installed: one way is to have the sensors 40 installed directly under the cushion by the automobile manufacturer as part of the vehicle's original equipment (See FIG. 4). This would then allow the sensors 40 to be electrically connected to the alarm circuit 32; the alarm circuit 32 would then have an electrical connector 33 in the rear seats that may be connected to a child car seat 46 (See FIG. 6) equipped with a seat belt device 12 that would interact with the alarm circuit 32.

Figure 5:
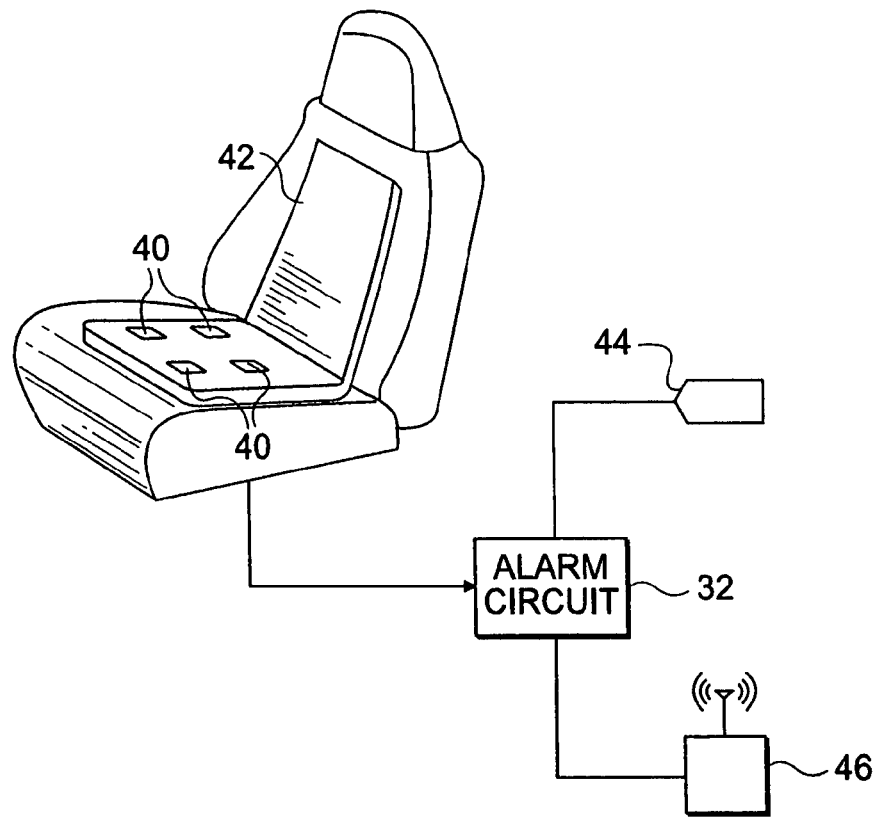
FIG. 5 shows a portable seat cushion according to one embodiment of the present invention.
Figure 6:
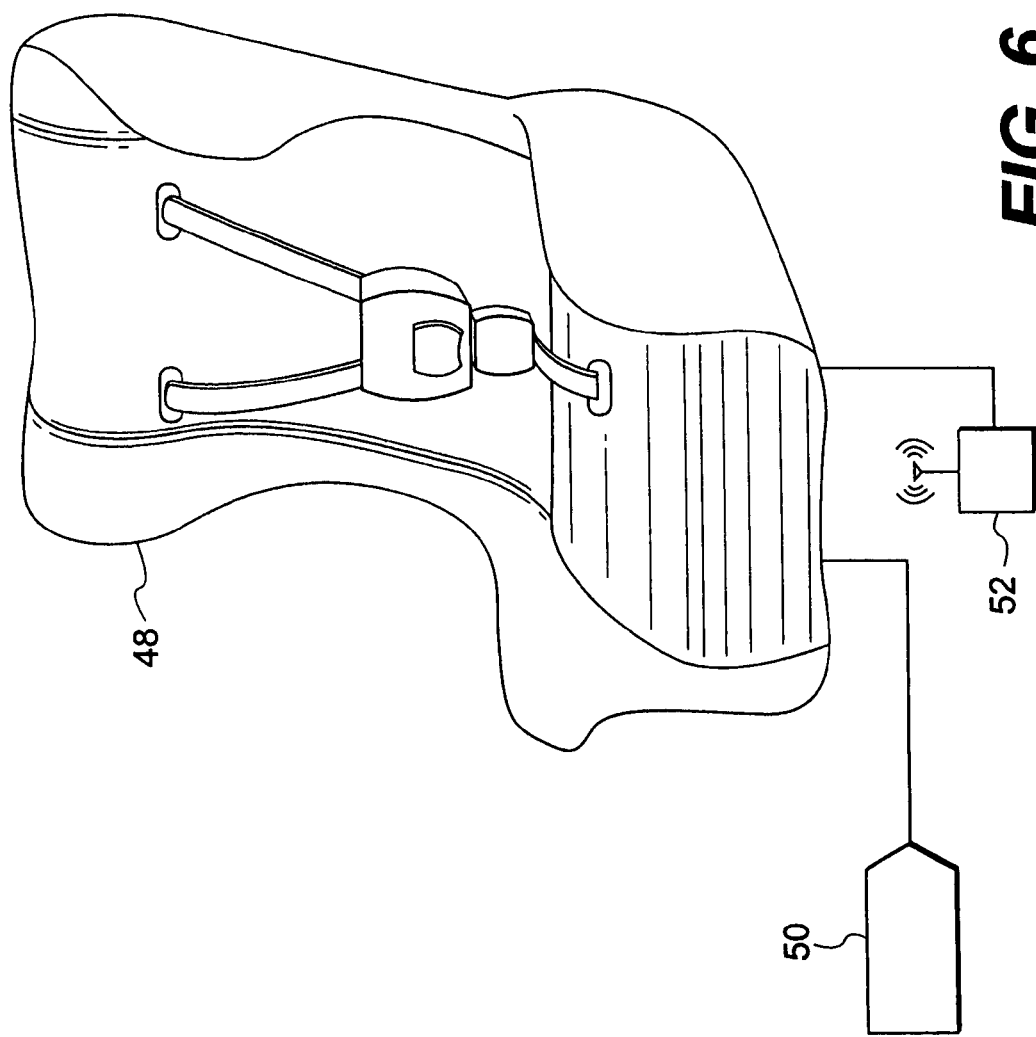
FIG. 6 shows the general configuration of a child car seat specially equipped and designed to operate in conjunction with the present invention.

For used cars or in aftermarket sales, the present invention may be implemented using a portable seat cushion 42 placed on the driver's seat, as shown in FIG. 5. The portable seat cushion 42 has the sensors 40 installed within it, as well as the alarm circuit 32. The alarm circuit 32 in the portable seat cushion 42 may then be equipped with either (a) a hardwire connector 44 that may be fed to the rear area of the vehicle and connected to a child car seat belt device 12 or a rear seat belt device 20; or (b) a wireless transmitter/receiver 46 that would communicate with a child car seat belt device 12 or a rear seat belt device 20 having a corresponding wireless transmitter/receiver. Alternatively, a child car seat 48 as shown in FIG. 6 equipped with a corresponding connector 50 to attach to the hardwire connector or having a wireless transmitter/receiver 52 may be used in conjunction with the portable seat cushion 42.

In operation, when the driver sits down, the weight of the driver presses on the sensors 40, which then send a signal to the alarm circuit 32 to disable the timer 30, or more simply disable the alarm circuit 32, such as by cutting off its power supply. When the driver exits the vehicle, the alarm circuit 32 is re-activated, either by enabling the timer 30 or by enabling alarm circuit 32 (i.e., restoring power).

Refueling the Vehicle

In a further embodiment as shown in FIGS. 7-8, the system of the present invention may also be electrically connected to a gas cap cover device 72 in order to disable the alarm circuit 32 while the driver is fueling the vehicle. In this embodiment, while the driver is out of the driver's seat or the portable seat cushion such that the alarm circuit 32 is active and the timer 30 is running, when the gas cap cover 70 is opened, the device 72 detects the opening and the alarm circuit 32 is disabled. Alternatively, the opening of the gas cap cover 70 causes the device 72 to send a signal to the alarm circuit 32 which would then temporarily disable the timer 30. When the gas cap cover 70 is closed, the device senses the closing whereby the alarm circuit 32 is reactivated and/or the timer 30 is enabled.

In one implementation of the gas cap cover embodiment, the gas cap cover device 72 is a simple contact switch that is hardwired in series to the child car seat and to the driver's seat or the portable seat cushion. The contact switch is the normally-closed type that would remain closed while the gas cap cover 70 is locked in place. When the gas cap cover 70 is opened, the contact switch would also open thereby breaking contact and cutting power to the alarm circuit 32 or disabling the timer 30.

In another implementation, the gas cap cover device 72 is a proximity or contact sensor electrically connected to the alarm circuit 32 that senses the opening/closing of the gas cap cover 70. When the gas cap cover 70 is open, the device 72 sends a signal that then disables the alarm circuit 32 or tells the alarm circuit 32 to disable the timer 30. When the gas cap cover 72 is closed, the device 72 would enable the alarm circuit 32 or signal the alarm circuit 32 to enable the timer 30.

Opening the Vehicle Trunk

In an even further embodiment as shown in FIGS. 7-8, the system of the present invention may also be electrically connected to a trunk lid device 76 in order to disable the alarm circuit 32 while the driver is accessing the vehicle's trunk. In this embodiment, while the driver is out of the driver's seat or the portable seat cushion such that the alarm circuit 32 is active and the timer 30 is running, when the trunk lid 74 is opened, the device 76 detects the opening and the alarm circuit 32 is disabled. Alternatively, the opening of the trunk lid 74 causes the device 76 to send a signal to the alarm circuit 32 which would then temporarily disable the timer 30. When the trunk lid 74 is closed, the device senses the closing whereby the alarm circuit 32 is reactivated and/or the timer 30 is enabled.

In one implementation of the trunk lid embodiment, the trunk lid device 76 is also a simple contact switch that is hardwired in series to the child car seat and to the driver's seat or the portable seat cushion. The contact switch is the normally-closed type that would remain closed while the trunk lid 74 is locked in place. When the trunk lid 74 is opened, the contact switch would also open thereby breaking contact and cutting power to the alarm circuit 32 or disabling the timer 30.

In another implementation, the trunk lid device 76 is also a proximity or contact sensor electrically connected to the controller 36 that senses the opening/closing of the trunk lid 74. When the trunk lid 74 is open, the device 76 sends a signal that then tells the alarm circuit 32 to disable the timer 30. When the trunk lid 76 is closed, the device 76 would signal the alarm circuit 32 to enable the timer 30.

The Warning Device

The warning device 34 for the system may be implemented using several different components. In one implementation, the alarm circuit 32 uses the horn already built into the vehicle as the warning device 34. As shown in FIGS. 7-8, the car horn is wired to the battery of the car and to an output port of the alarm circuit 32, or the timer 30. The alarm circuit 32 or timer 30 is in turn wired to the sensors 40 in driver's seat or in the portable seat cushion 42. The alarm circuit 32 is then hardwired or wirelessly connected to the child safety seat, as discussed above.

Alternatively, the alarm circuit 32 may use an aftermarket siren to be installed into the vehicle as the warning device 34. FIGS. 7-8 are again applicable showing either a car horn or siren wired to the battery of the car and to an output port of the alarm circuit 32, or the timer 30. The alarm circuit 32 or timer 30 is in turn wired to the sensors 40 in the driver's seat or in the portable seat cushion 42. The alarm circuit 32 is then hardwired or wirelessly connected to the child safety seat, as discussed above.

Further alternatives for the alarm circuit 32 include connecting the system to the vehicle's headlights and signal lights that would start flashing when set off, a RF transmitter that sends a signal to a pager device being worn by the driver, a cellular telephone transmitter that sends an emergency call to the driver's cellular telephone, or a combination of any of the above.

Power Source

There are at least three ways that the system of the invention can be powered. First, the system can be powered directly from the vehicle's battery. Second, the system can also be powered with a DC power cord (with converter if needed) that is connected via the vehicle's lighter outlet. Third, the system can be powered with an auxiliary battery stored in various locations in the vehicle, including the trunk, underneath a seat or inside a specially-equipped child car seat. It would be understood that such an auxiliary battery would need to have the necessary voltage and current capacities to power at least the controller 36, the timer 30, the alarm circuit 32 and any sensors or other equipment needed to operate the system.

Although the present invention has been fully described in connection with the preferred embodiment thereof with reference to the accompanying drawings, it is to be noted that various changes and modifications will be apparent to those skilled in the art, such as but not limited to those examples and variations described above. Such changes and modifications are to be understood as included within the scope of the present invention as defined by the appended claims, unless they depart therefrom.

What is claimed is:

1. A vehicle child seat safety system for preventing a child from being left unattended in a vehicle, comprising:
   a child safety belt device that senses whether or not a child is secured to a child car seat by a first belt attached to the child car seat;
   a driver detecting device that senses when a driver is present or not present inside the vehicle, the driver detecting device being formed as a plurality of sensors operatively connected to the driver seat of the vehicle to detect whether the driver is seated in the vehicle;
   an alarm circuit operatively connected to an alarm, the child safety belt device, and the driver detecting device, the alarm circuit including a delay timer that times how long the driver is not present in the vehicle, wherein the alarm circuit sounds the alarm after a predetermined time period set in the delay timer when the child safety belt device senses that the child is present inside the vehicle and the driver detecting device senses that the driver is not present in the vehicle; and
   an alarm disabling device operatively connected to the alarm circuit to temporarily disable the delay timer while the driver is accessing the vehicle after the alarm circuit detects that the driver is not in the vehicle.

2. A vehicle child safety system according to claim 1, wherein the child safety belt device that senses when a child is seated inside the vehicle includes a seat belt latch having a sensor that detects when the seat belt latch is connected.

3. A vehicle child safety system according to claim 1, wherein the child safety belt device that senses when a child is seated inside the vehicle includes a car seat having a seat belt device having a sensor that detects when the seat belt latch is connected.

4. A vehicle child safety system according to claim 1, wherein the child safety belt device that senses when a child is seated inside the vehicle includes a rear seat belt having a sensor that detects when the rear seat belt latch is connected.

5. A vehicle child safety system according to claim 1, wherein the driver detecting device that senses when a driver is present or not present inside the vehicle includes the plurality of sensors being incorporated into the driver seat of the vehicle.

6. A vehicle child safety system according to claim 1, wherein the driver detecting device that senses when a driver is present or not present inside the vehicle includes a portable seat cushion having the plurality of sensors incorporated therein.

7. A vehicle child safety system according to claim 1, wherein the alarm disabling device includes a gas cap cover device to sense when the gas cap is open so as to disable the delay timer.

8. A vehicle child safety system according to claim 1, wherein the alarm disabling device includes a trunk lid device to sense when the trunk lid is open so as to disable the alarm circuit.

* * * * *